US00RE41480E

(19) United States
(12) Reissued Patent
Kim

(10) Patent Number: US RE41,480 E
(45) Date of Reissued Patent: Aug. 10, 2010

(54) VIDEO DISPLAY APPARATUS WITH ON-SCREEN DISPLAY PIVOTING FUNCTION

(75) Inventor: Young-Chan Kim, Anyang (KR)

(73) Assignee: Samsung Electronics Co., Ltd., Suwon-si (KR)

(21) Appl. No.: 10/775,058
(22) Filed: Feb. 10, 2004

Related U.S. Patent Documents

Reissue of:
(64) Patent No.: 6,346,972
Issued: Feb. 12, 2002
Appl. No.: 09/412,745
Filed: Oct. 5, 1999

(30) Foreign Application Priority Data

May 26, 1999 (KR) ..... 99-19077

(51) Int. Cl.
*H04N 5/50* (2006.01)
*H04N 9/74* (2006.01)
*G09G 5/00* (2006.01)

(52) U.S. Cl. ..... 348/569; 348/583; 348/E5.1; 345/649; 345/659; 345/660

(58) Field of Classification Search ..... 345/649, 345/689, 650, 659, 660; 348/569, 583
See application file for complete search history.

(56) References Cited

U.S. PATENT DOCUMENTS 4,267,555 A * 5/1981 Boyd et al. ..... 345/10
5,134,390 A * 7/1992 Kishimoto et al. ..... 345/659
5,189,404 A * 2/1993 Masimo et al. ..... 345/659
5,329,289 A * 7/1994 Sakamoto et al. ..... 345/659
5,381,163 A * 1/1995 Yokoyama ..... 345/658
5,542,377 A * 8/1996 Gemill et al. ..... 119/753
5,543,857 A * 8/1996 Wehmeyer et al. ..... 348/589
5,661,632 A * 8/1997 Register ..... 361/683
5,708,561 A * 1/1998 Huilgol et al. ..... 361/681
5,774,233 A * 6/1998 Sakamoto ..... 358/451
5,798,750 A * 8/1998 Ozaki ..... 345/656
5,949,408 A * 9/1999 Kang et al. ..... 345/169
5,949,504 A * 9/1999 Kim ..... 349/59
5,956,049 A * 9/1999 Cheng ..... 345/568
5,963,266 A * 10/1999 Fujimori ..... 348/569
5,973,664 A * 10/1999 Badger ..... 345/659
5,986,634 A * 11/1999 Alioshin et al. ..... 345/649
6,107,746 A * 8/2000 Chen ..... 315/185 R
6,115,025 A * 9/2000 Buxton et al. ..... 345/659
6,137,468 A * 10/2000 Martinez et al. ..... 345/649
6,239,787 B1 * 5/2001 Sugaya ..... 345/169
6,268,887 B1 * 7/2001 Watanabe et al. ..... 348/554
6,307,575 B1 * 10/2001 Matsushita ..... 715/788
6,326,978 B1 * 12/2001 Robbins ..... 345/654
6,639,603 B1 * 10/2003 Ishii ..... 345/568

FOREIGN PATENT DOCUMENTS

JP 62-173509 1/1987

* cited by examiner

*Primary Examiner*—Ryan R Yang
(74) *Attorney, Agent, or Firm*—Stanzione & Kim, LLP

(57) ABSTRACT

A video display apparatus has an on-screen display pivoting function in which, even when the user arbitrarily pivots the monitor of a computer system, the on-screen display is normally displayed. An on-screen display (OSD) generating section receives horizontal/vertical synchronizing signals and clock signals, and outputs first video signals in response to OSD control signals. A pivot circuit section receives the first video signals, stores a write address of the first video signals in a position-converting manner and in correspondence with a pre-set pivot write address, and converts the write address in response to the horizontal/vertical synchronizing signals and the clock signals so as to output the first video signals in the form of second video signals. A scale converting section furnishes the horizontal/vertical synchronizing signals and the clock signals to the OSD generating section and the pivot circuit section, respectively, and receives the second video signals so as to convert scales of the second video signals. A control section furnishes the OSD control signals and scale control signals to the OSD generating section and the scale converting section, respectively, and furnishes pivot control signals to the pivot control section in response to mode control signals generated by the user.

33 Claims, 7 Drawing Sheets r1 • • • r8 • • •

| | | 1 | 2 | 3 | 4 | 5 | 6 | 7 | 8 | 1 | 2 | 3 | 4 | 5 | 6 | 7 | 8 |
|---|---|---|---|---|---|---|---|---|---|---|---|---|---|---|---|---|---|
| c1 | 1 | 0 | 0 | 0 | 0 | 0 | 0 | 0 | 0 | 0 | 0 | 0 | 0 | 0 | 0 | 0 | 0 |
| | 2 | 0 | 0 | 1 | 1 | 1 | 1 | 0 | 0 | 0 | 0 | 1 | 1 | 1 | 0 | 0 | 0 |
| • | 3 | 0 | 0 | 1 | 0 | 0 | 1 | 0 | 0 | 0 | 0 | 1 | 0 | 0 | 1 | 0 | 0 |
| | 4 | 0 | 0 | 1 | 0 | 0 | 1 | 0 | 0 | 0 | 0 | 1 | 1 | 1 | 0 | 0 | 0 |
| • | 5 | 0 | 0 | 1 | 1 | 1 | 1 | 0 | 0 | 0 | 0 | 1 | 0 | 0 | 1 | 0 | 0 |
| | 6 | 0 | 0 | 1 | 0 | 0 | 1 | 0 | 0 | 0 | 0 | 1 | 0 | 0 | 1 | 0 | 0 |
| • | 7 | 0 | 0 | 1 | 0 | 0 | 1 | 0 | 0 | 0 | 0 | 1 | 1 | 1 | 0 | 0 | 0 |
| c8 | 8 | 0 | 0 | 0 | 0 | 0 | 0 | 0 | 0 | 0 | 0 | 0 | 0 | 0 | 0 | 0 | 0 |
| | 1 | 0 | 0 | 0 | 0 | 0 | 0 | 0 | 0 | 0 | 0 | 0 | 0 | 0 | 0 | 0 | 0 |
| • | 2 | 0 | 0 | 0 | 1 | 1 | 1 | 0 | 0 | 0 | 0 | 1 | 1 | 1 | 0 | 0 | 0 |
| | 3 | 0 | 0 | 1 | 0 | 0 | 0 | 0 | 0 | 0 | 0 | 1 | 0 | 0 | 1 | 0 | 0 |
| • | 4 | 0 | 0 | 1 | 0 | 0 | 0 | 0 | 0 | 0 | 0 | 1 | 0 | 0 | 1 | 0 | 0 |
| | 5 | 0 | 0 | 1 | 0 | 0 | 0 | 0 | 0 | 0 | 0 | 1 | 0 | 0 | 1 | 0 | 0 |
| • | 6 | 0 | 0 | 1 | 0 | 0 | 0 | 0 | 0 | 0 | 0 | 1 | 0 | 0 | 1 | 0 | 0 |
| | 7 | 0 | 0 | 0 | 1 | 1 | 1 | 0 | 0 | 0 | 0 | 1 | 1 | 1 | 0 | 0 | 0 |
| | 8 | 0 | 0 | 0 | 0 | 0 | 0 | 0 | 0 | 0 | 0 | 0 | 0 | 0 | 0 | 0 | 0 |

VIDEO DISPLAY APPARATUS WITH ON-SCREEN DISPLAY PIVOTING FUNCTION

Matter enclosed in heavy brackets [ ] appears in the original patent but forms no part of this reissue specification; matter printed in italics indicates the additions made by reissue.

BACKGROUND OF THE INVENTION

1. Technical Field

The present invention relates to a video display apparatus with an on-screen display pivoting function. More specifically, the present invention relates to a video display apparatus with an on-screen display pivoting function in which, even when the user arbitrarily pivots the monitor of a computer system, the on-screen display is normally displayed.

2. Related Art

Generally, a video display apparatus such as the monitor of a computer system has functions such that the user can arbitrarily adjust the brightness and size of the picture. In addition, such a video display apparatus typically has an on-screen display (OSD) capability.

Monitors associated with computer systems also have the capability of being rotated by 90 degrees about an axis passing from the front of the monitor to the rear thereof. However, when such rotation is carried out, the OSD on the screen of the monitor also rotates through 90 degrees so that the letters and figures of the OSD appear to be lying on their sides relative to their previous, unrotated appearance.

Thus, as a result of such rotation of the monitor, the user thereof is substantially inconvenienced in that it is difficult for the user to see or accurately view the OSD.

SUMMARY OF THE INVENTION

The present invention is intended to overcome the above described disadvantage.

Therefore, it is an object of the present invention to provide a video display apparatus with an on-screen display pivoting function in which, even when a video display apparatus such as a monitor of a computer system is arbitrarily turned, the on-screen display can be displayed in a normal manner.

In achieving the above object, the video display apparatus with an on-screen display pivoting function according to the present invention includes: an OSD (on-screen display) generating section for receiving horizontal/vertical synchronizing signals and clock signals from an external source, and for outputting first video signals in response to OSD control signals from an outside source; a pivot circuit section for receiving the first video signals, for storing in a position-converting manner a write address of the first video signals in correspondence with a pre-set pivot write address, and for converting the write address in response to the horizontal/vertical synchronizing signals and the clock signals so as to output the first video signals in the form of second video signals; a scale converting section for furnishing the horizontal/vertical synchronizing signals and the clock signals to the OSD generating section and the pivot circuit section, respectively, and for receiving the second video signals so as to convert scales of the second video signals in response to scale control signals from an outside source; and a control section for furnishing OSD control signals and scale control signals to the OSD generating section and to the scale converting section, respectively, in response to OSD driving signals (generated by a user), and for furnishing pivot control signals to the pivot control section in response to mode control signals (also generated by the user).

In another aspect of the present invention, the video display apparatus with an on-screen display pivoting function according to the present invention includes: a power supply section for supplying power; a display section for receiving the power from the power supply section, and for displaying a picture corresponding to video signals externally inputted by a user; a signal converting/clock generating section for receiving horizontal/vertical synchronizing signals and video signals, for converting the video signals to digital signals in response to first control signals (from an outside source), and for outputting clock signals; a decoder for receiving brightness/chromatic signals from an outside source so as to convert the brightness/chromatic signals to digital signals in response to second control signals (from an outside source); a frame rate converting section for receiving the horizontal/vertical synchronizing signals and the video signals from the signal converting/clock generating section, for receiving the brightness/chromatic signals from the decoder, for storing the video signals in response to third control signals (from an outside source), and for converting the video signals (thus stored) to a certain frequency ratio corresponding to display characteristics of a display section; an OSD (on-screen display) generating section for receiving horizontal/vertical synchronizing signals and clock signals from an outside source, and for outputting first video signals in response to OSD control signals from an outside source; a pivot circuit section for receiving the first video signals, for storing in a position-converting manner a write address of the first video signals corresponding to a pre-set pivot write address, and for converting the write address in response to the horizontal/vertical synchronizing signals and the clock signals so as to output the first video signals in the form of second video signals; a scale converting section for furnishing the horizontal/vertical synchronizing signals and the clock signals to the OSD generating section and the pivot circuit section, respectively, for converting scales of video signals of the frame rate converting section, and for receiving the second video signals so as to convert scales of the second video signals of the pivot circuit section in response to scale control signals from an outside source; a control section for furnishing the first, second and third control signals to the signal converting/clock generating section, the decoder and the frame rate converting section, respectively, for furnishing OSD control signals and scale control signals to the OSD generating section and to the scale converting section, respectively, in response to OSD driving signals (generated by a user), and for furnishing pivot control signals to the pivot control section in response to mode control signals (generated by the user); and a driving section for furnishing the video signals and driving signals from the scale converting section to the display section.

In this video display apparatus with an on-screen display pivoting function, even if the screen body is turned by 90 degrees, the letters and figures of the on-screen display are displayed in the normal manner. Therefore, the user can use the on-screen display in a convenient way.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
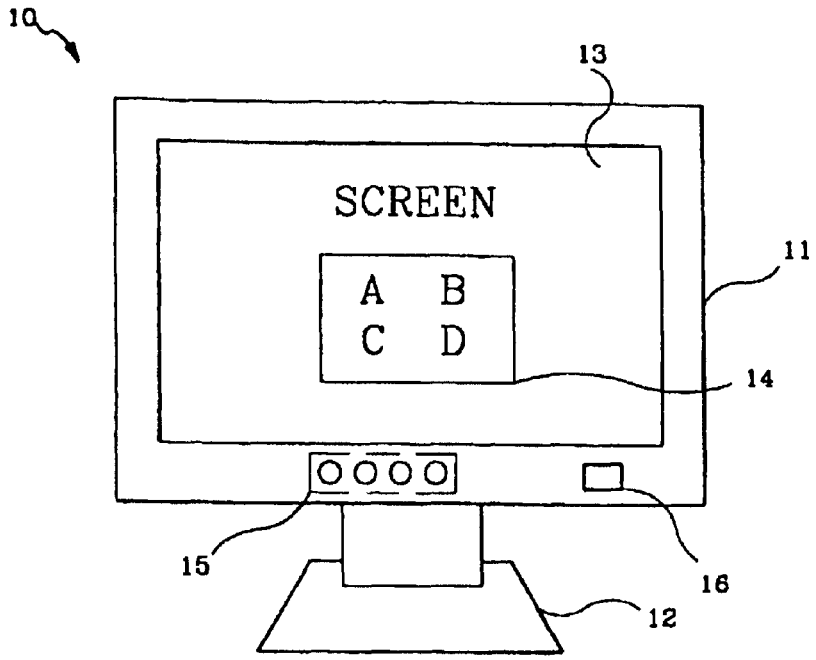
FIG. 1 illustrates an on-screen display of a video display apparatus.

FIG. 1 illustrates an on-screen display of a video display apparatus.

As shown in FIG. 1, the on-screen display function is carried out on a screen 13 when the user manipulates a particular key of a key pad 15 to generate an on-screen display 14, the key pad 15 being located on a screen body 11 of the video display apparatus 10.

Figure 2:
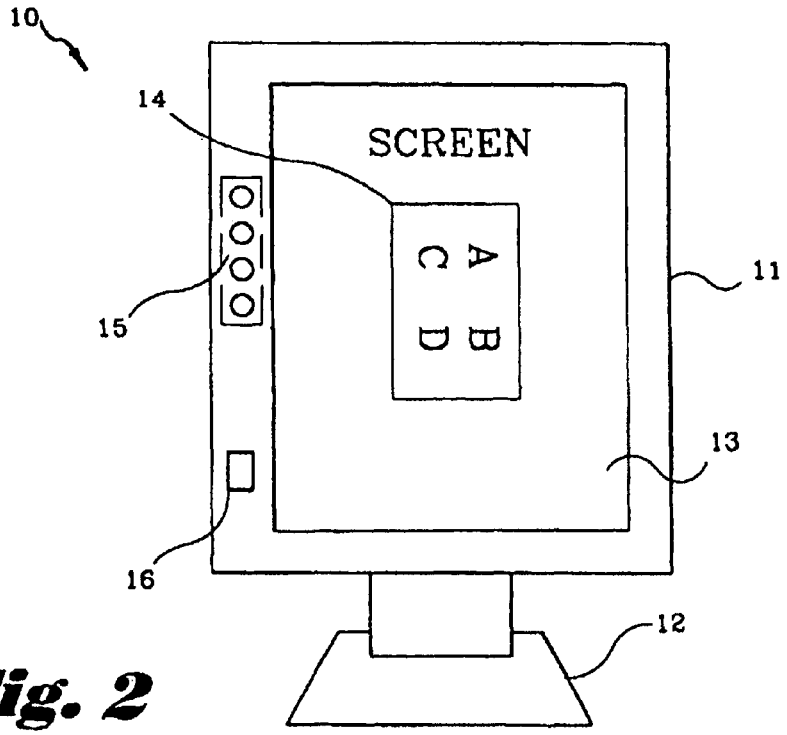
FIG. 2 illustrates an abnormal display of an on-screen display when the screen body is turned by 90 degrees.

FIG. 2 illustrates an abnormal display of an on-screen display when the screen body is turned by 90 degrees. As shown in FIG. 2, if the screen body 11 of the video display apparatus 10 is turned by 90 degrees, then the on-screen display 14 on screen 13 is also turned by 90 degrees. Therefore the letters and figures of the on-screen display are laid on their side as viewed by the user. Accordingly, when the screen body 11 of the video display apparatus 10 is turned by 90 degrees, the user encounters a substantial inconvenience.

Figure 3:
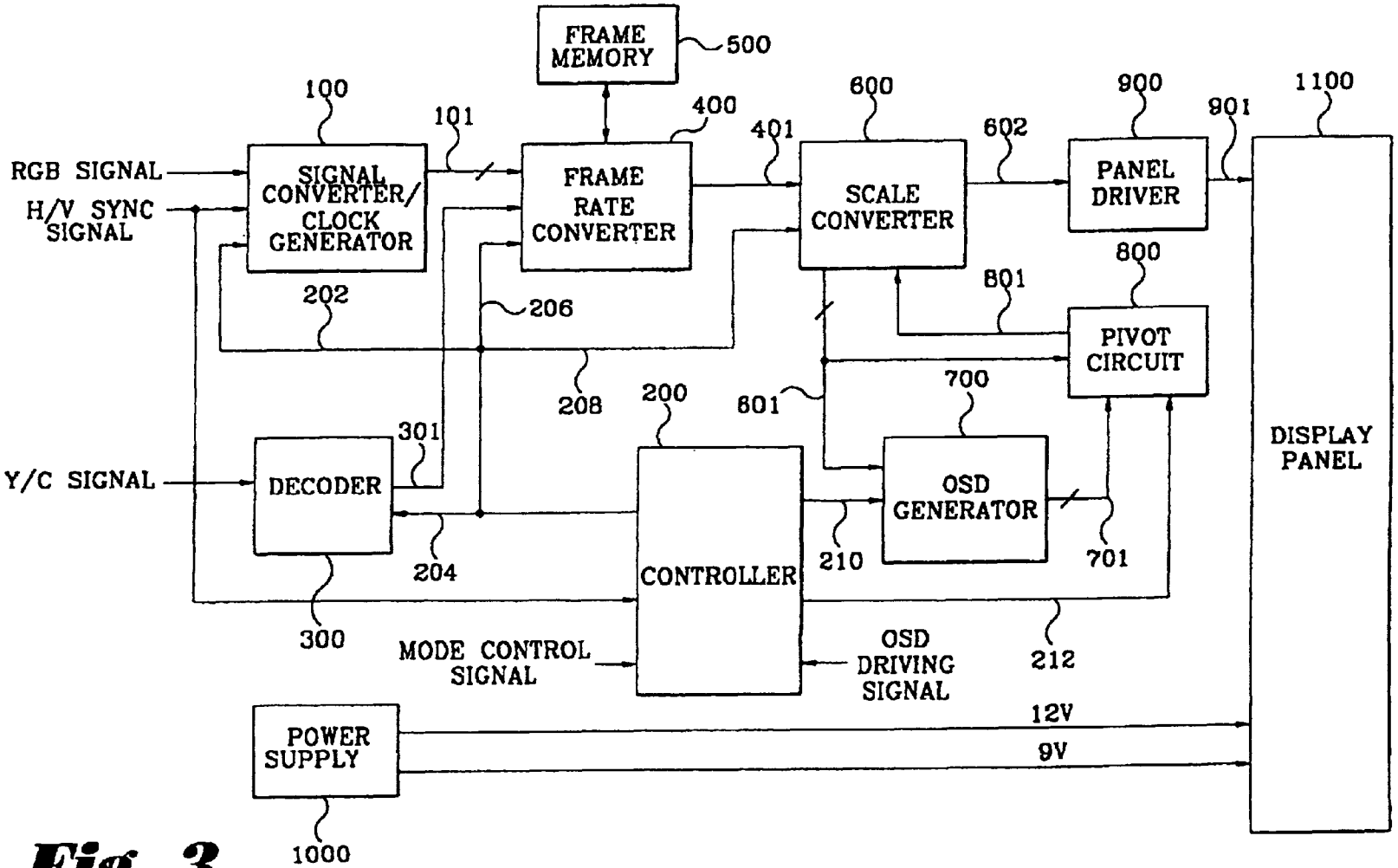
FIG. 3 is a block diagram showing a video display apparatus with an on-screen display pivoting function according to the present invention.
Figure 4:
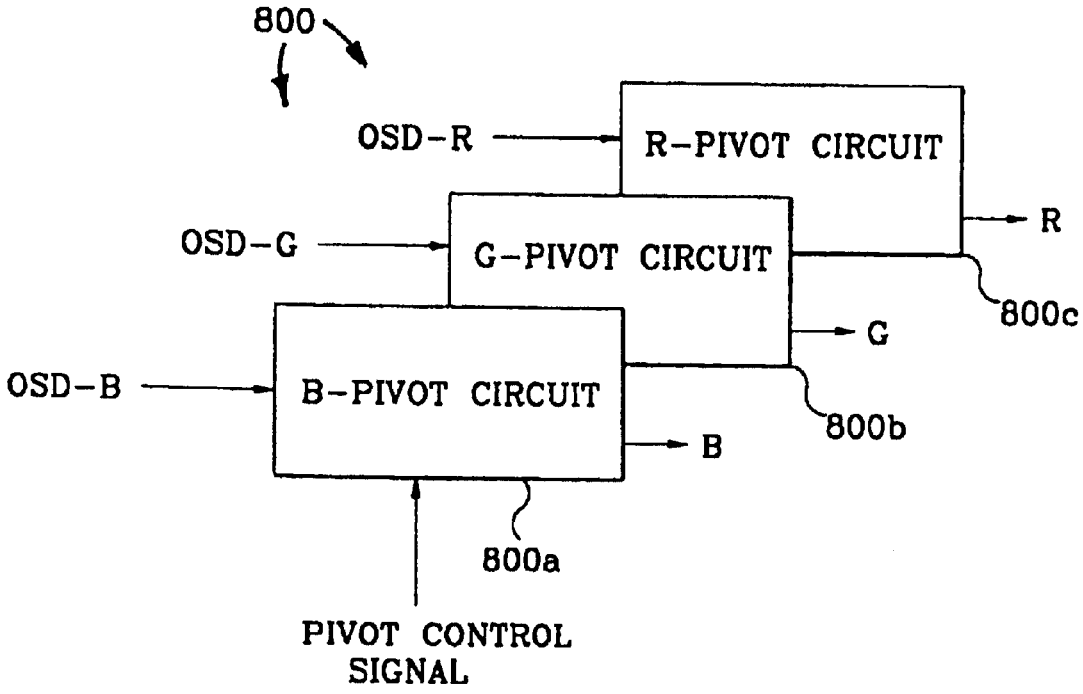
FIG. 4 is a block diagram showing a pivot circuit section according to the present invention.

FIG. 3 is a block diagram showing a video display apparatus with an on-screen display pivoting function according to the present invention; FIG. 4 is a block diagram showing a pivot circuit section according to the present invention; and FIG. 5 is a block diagram showing another embodiment of the pivot circuit section according to the present invention.

Referring to FIG. 3, the video display apparatus with an on-screen display pivoting function according to the present invention includes: a power supply 1000 for supplying power (9 V or 12 V); a display panel 1100 for receiving power from the power supply 1000, and for displaying a picture of externally inputted R-G-B video signals to a user in response to driving signals; a signal converter/clock generator 100 for receiving horizontal/vertical synchronizing signals H/V SYNC and R-G-B video signals, for converting the R-G-B video signals to digital signals in response to first control signals (from an outside source), for generating clock signals, and for producing output signals 101; a decoder 300 for receiving brightness/chromatic signals (Y/C) from an outside source so as to convert the brightness/chromatic signals to digital signals 301 in response to second control signals 204 (from an outside source); a frame rate converter 400 for receiving the output signals 101 from the signal converter/clock generator 100, for receiving the digital signals 301 from the decoder 300, for storing R-G-B signals in response to third control signals 206 (from an outside source), for converting the R-G-B signals (thus stored) so as to have a certain frequency ratio corresponding to display characteristics of a display panel 1100, and for generating an output 401; a frame memory 500 for storing the R-G-B signals for the signal converter/clock generator 100 under the control of the frame rate converter 400; an OSD (on-screen display) generator 700 for receiving horizontal/vertical synchronizing signals and clock signals 601 from an outside source, and for outputting first R-G-B signals 701 in response to OSD control signals 210 from a controller 200; a pivot circuit 800 for receiving the first R-G-B signals 701, for storing in a position-converting manner a write address of the first R-G-B signals 701 in correspondence to a pre-set pivot write address, and for converting the write address in response to the horizontal/vertical synchronizing signals and the clock signals so as to output second R-G-B signals 801; a scale converter 600 for furnishing the horizontal/vertical synchronizing signals and the clock signals 601 to the OSD generator 700 and the pivot circuit 800, respectively, for converting scales of video signals of the frame rate converter 400, and for receiving the second R-G-B signals to convert scales of the second R-G-B signals 801 of the pivot circuit 800 in response to scale control signals 208 from an outside source; a controller 200 for furnishing the first, second and third control signals 202, 204 and 206, respectively, to the signal converting/clock generator 100, the decoder 300 and frame rate converter 400, respectively, for furnishing OSD control signals 210 and scale control signals 208 to the OSD generator 700 and to the scale converter 600, respectively, in response to OSD driving signals (generated by the user), and for furnishing pivot control signals 212 to the pivot circuit 800 in response to mode control signals (generated by the user); and a panel driver 900 for receiving the R-G-B signals 602 from the scale converter 600 and furnishing driving signals 901 to the display panel 1100.

Referring to FIG. 4, the pivot circuit 800 includes: a B-pivot circuit 800a for receiving B-data signals OSD-B of the first R-G-B signals 701 from the OSD generator 700, for storing in a position-converting manner a write address of the B-data signals OSD-B in correspondence with a pre-set pivot write address in response to pivot control signals 212, and for converting the write address in response to the horizontal/vertical synchronizing signals and clock signals 601 so as to output the stored B-data signals OSD-B in the form of B-data signals B of the second R-G-B signals 801; a G-pivot circuit 800b for receiving G-data signals OSD-G of the first R-G-B signals 701 from the OSD generator 700, for storing in a position-converting manner a write address of the G-data signals OSD-G in correspondence with a pre-set pivot write address in response to pivot control signals 212, and for converting the write address in response to the horizontal/vertical synchronizing signals and clock signals 601 so as to output the stored G-data signals OSD-G in the form of G-data signals G of the second R-G-B signals 801; and an R-pivot circuit 800c for receiving R-data signals OSD-R of the first R-G-B signals 701 from the OSD generator 700, for storing in a position-converting manner a write address of the R-data signals OSD-R in correspondence with a pre-set pivot write address in response to pivot control signals 212, and for converting the write address in response to the horizontal/vertical synchronizing signals and clock signals 601 so as to output the stored R-data signals OSD-R in the form of R-data signals R of the second R-G-B signals 801.

Figure 5:
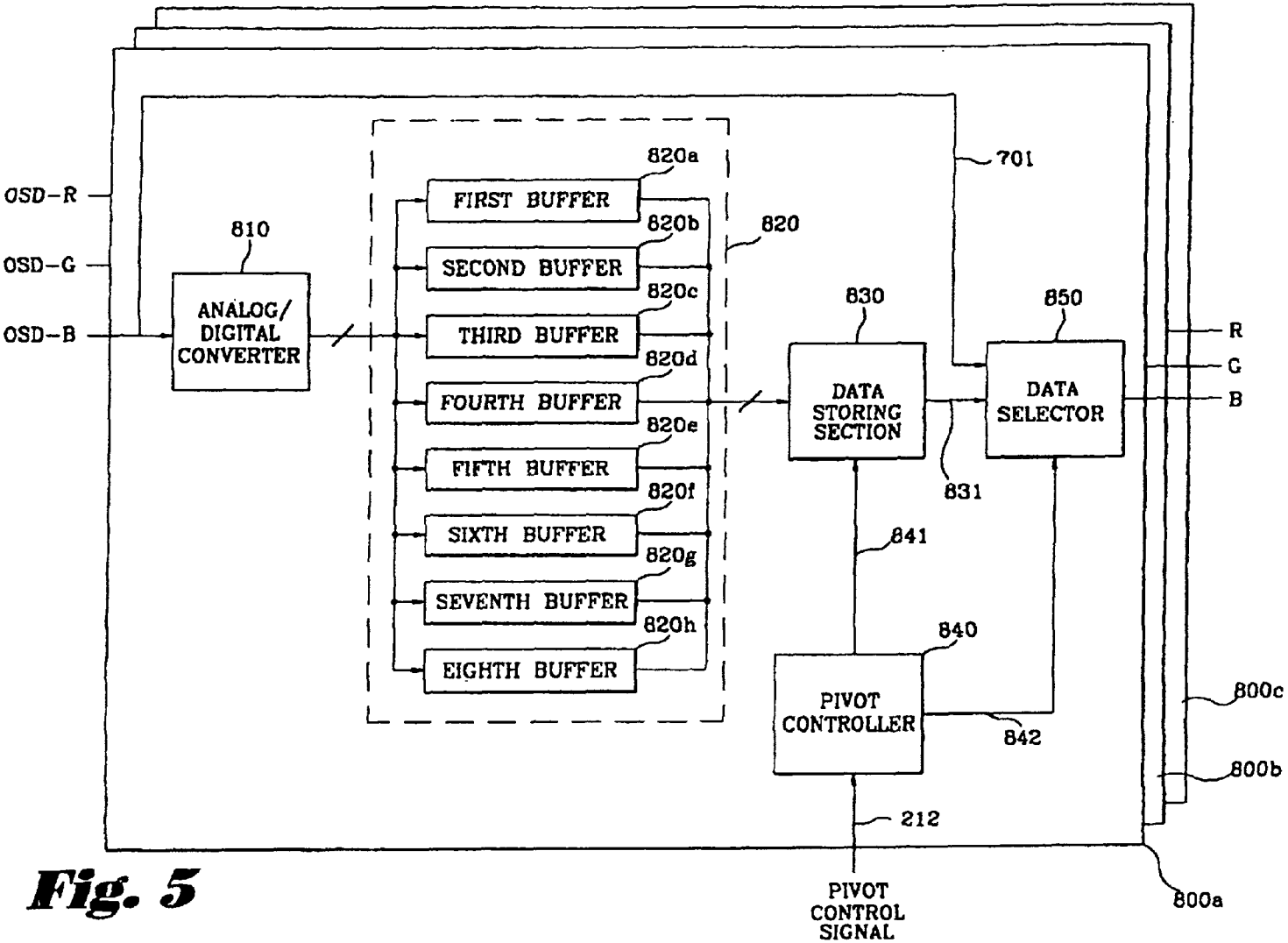
FIG. 5 is a block diagram showing another embodiment of the pivot circuit section according to the present invention.

Referring to FIG. 5, the B, G and R-pivot circuits 800a, 800b and 800c, respectively, have the same composition.

The B-pivot circuit 800a includes: an analog/digital converter 810 for receiving the B-data signals of the first R-G-B signals 701 from the OSD generator 700 so as to convert them to digital signals; a buffering section 820 for receiving and storing the digital B-data signals from the analog/digital converter 810, and for outputting previous B-data signals upon receiving next B-data signals from the analog/digital converter 810; a pivot controller 840 for outputting storing position control signals 841 and data selection control signals 842 in response to pivot control signals 212 from the controller 200; a data storing section 830 for receiving and storing the B-data signals of the buffering section 820, and for storing in a position-converting manner a write address of the B-data signals of the buffering section 820 in correspondence with a pre-set pivot write address in response to store position control signals 841; and a data selector 850 for receiving the B-data signals of the first R-G-B signals 701 or the B-data signals of the data storing section 830 so as to output the B-data signals of the first R-G-B signals 701 or the B-data signals of the data storing section 830 in the form of second R-G-B signals 801.

Under this condition, the buffering section 820 of the B-pivot circuit 800a includes eight buffers 820a, 820b, 820c, 820d, 820e, 820f, 820g and 820h for storing the 8-bit data of the analog/digital converter 810.

The compositions of the G-pivot circuit 800b and the R-pivot circuit 800c, respectively, are the same as that of the B-pivot circuit 800a. Further, the buffering sections of the G-pivot circuit 800b and the R-pivot circuit 800c, respectively, are the same as that of the B-pivot circuit 800a.

Now the operation of the video display apparatus with an on-screen display pivoting function according to the present invention will be described.

Figures 6, 7:
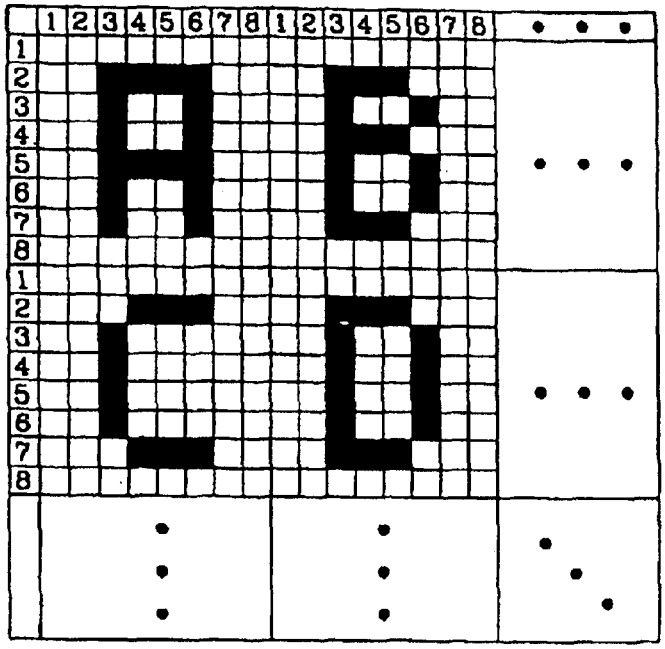
FIGS. 6 and 7 illustrate data maps which are stored in the case where the on-screen display pivoting function of the invention is not utilized.
Figure 8:
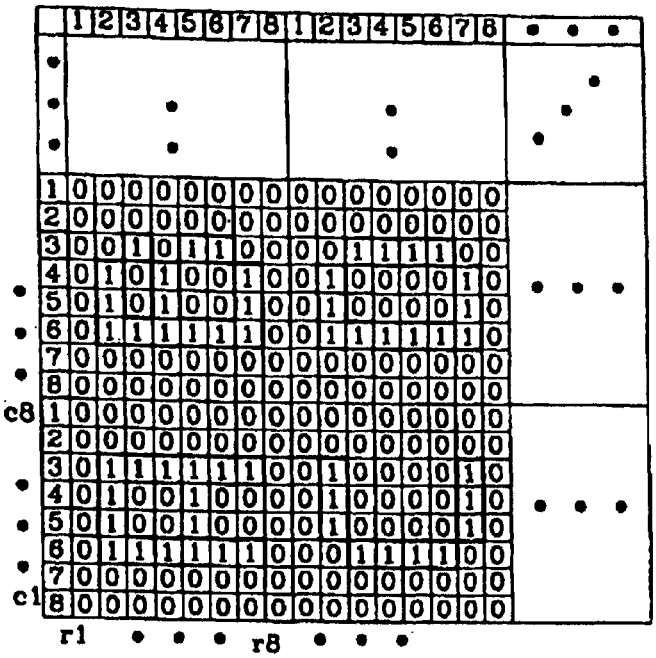
FIGS. 8 and 9 illustrate data maps which are stored in the case where the on-screen display pivoting function of the present invention is utilized.
Figure 9:
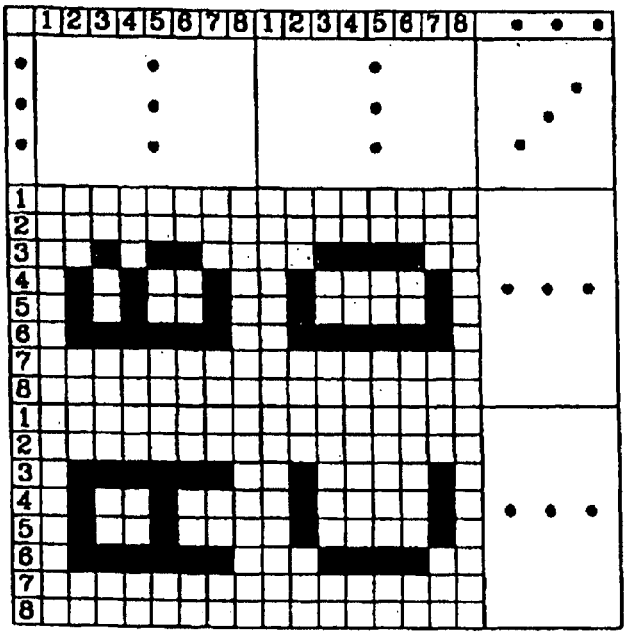
Figure 10:
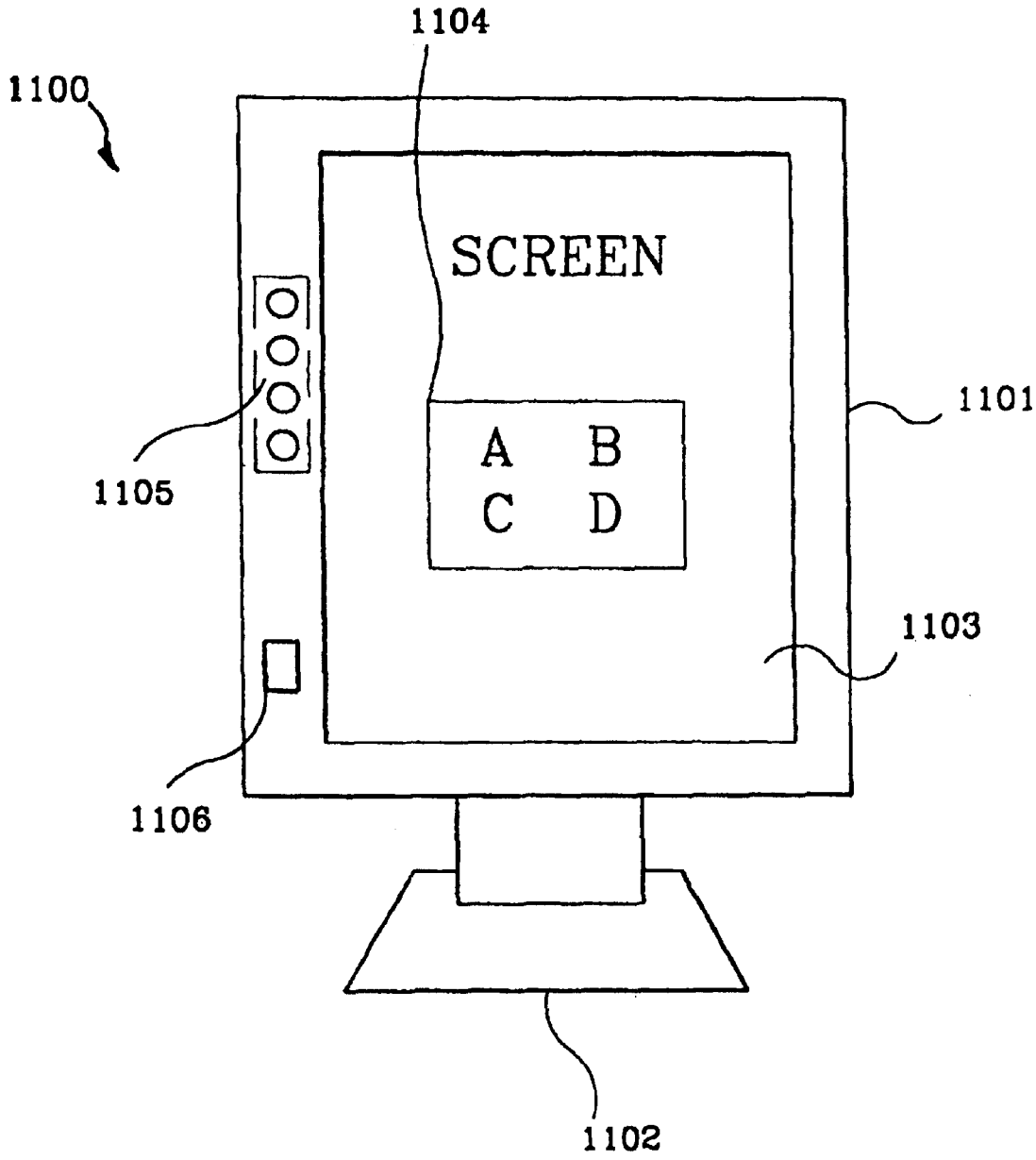
FIG. 10 illustrates the on-screen display displayed in the normal manner by the video display apparatus with an on-screen display pivoting function according to the present invention.

FIGS. 6 and 7 illustrate data maps which are stored in the case where the on-screen display pivoting function of the invention is not utilized. FIGS. 8 and 9 illustrate data maps which are stored in the case where the on-screen display pivoting function of the invention is utilized. FIG. 10 illustrates the on-screen display displayed in the normal manner in the video display apparatus with an on-screen display pivoting function according to the present invention.

The case where the user does not turn [the] *a* screen body [11] *1101* is the same as the conventional case and, therefore, the operation of this case will be omitted. The case where the user turns the screen body [11] *1101* clockwise by 90 degrees will be described.

Further, the operations of the components of the pivot circuit 800 will be described with reference to the B-pivot circuit 800a, because the operations of the G and R-pivot circuits 800b and 800c, respectively, are the same as that of the B-pivot circuit 800a.

First, referring to FIG. 3, the signal converter/clock generator 100 converts the incoming R-G-B signals to digital signals in response to the first control signals 202 of the controller 200. Further, the generator 100 generates clock signals 101 in response to the horizontal/vertical synchronizing signals so as to meet the operation criteria for the video display apparatus according to the present invention.

The decoder 300 converts the brightness/chromatic signals to digital signals 301 in response to the second control signals 204 of the controller 200.

The frame rate converter 400 writes the digital R-G-B signals of the signal converter/clock generator 100 into the frame memory 500. Then, the frame rate converter 400 sequentially reads them for conversion so as to have a certain frequency ratio corresponding to the characteristics of the display panel 1100.

Then, if the user supplies the OSD driving signal to the controller 200 by manipulating a particular key of the key pad 1105 (see FIG. 10) of the display panel 1100 to use an on-screen display 1104, then the controller 200 supplies an OSD control signal 210 to the OSD generator 700 in response to the user's OSD driving signal.

The OSD generator 700 supplies the first R-G-B signals 701 to the analog/digital converter 810 of the pivot circuit 800 in response to the OSD control signal 210.

Under this condition, the display panel 1100 has been turned by 90 degrees clockwise and, therefore, the user has to supply a mode control signal to the controller 200 by pressing another particular key of the key pad 1105 so that an on-screen display 1104 suitable for the turned status of the display panel 1100 will be displayed.

If the user does not manipulate the particular key to generate the mode control signal, then the on-screen display will be displayed with the letters and figures laid on their side as seen in FIG. 2.

Conversely, if the mode control signal is generated by the manipulation of the key by the user, then the controller 200 supplies a pivot control signal 212 to the pivot circuit 800 so as to display an on-screen display suitable to the turned status of the display panel 1100.

Then, the analog/digital circuit 810 of the B-pivot circuit 800a of the pivot circuit 800 sequentially receives the B data signals of the first R-G-B signals 701.

The first to eighth buffers 820a, . . . , 820h, respectively, of the buffering section 820 store the B data signals of the analog/digital circuit 810. Then, when the next B data signals are inputted, the preceding 8-bit B data signals are outputted.

That is, if the alphabet character "A" of FIG. 7 is taken as an example, the B data signals of the alphabet character "A" are supplied to the buffering section 820, starting from the first column C1 in the order of "00000000", "00111100", 00100100", "00100100", "00111100", "00100100", "00100100" and "00000000".

Under this condition, the G and R data signals of the alphabet character "A" are supplied in the same manner.

Then, the pivot controller 840 supplies the store position control signals 841 and the data selection control signals 842 to the data memory 830 and the data selector 850, respectively.

The data memory 830 then receives the B data signals of the alphabet character "A" from the first to eighth buffers 820a, . . . ,820h, respectively, of the buffering section 820 so as to store them.

However, the data memory 830 stores in a position-converting manner the storing address of the B data signals of the alphabet character "A" (which are inputted from the first to eighth buffers of the buffering section 820) in response to the storing position control signals of the pivot controller 840.

That is, the B data signals "00000000" which correspond to the first column C1, and which are first outputted from the buffering section 820, are stored in the first storing positions of the respective columns C1, C2, C3, C4, C5, C6, C7 and C8 of the alphabet character "A" of FIG. 8, that is, in the storing positions of the first row R1.

The B data signals "00111100" corresponding to the second column C2 for the alphabet character "A" of FIG. 7, which are outputted next, are stored in the second storing positions of the respective columns C1, C2, C3, C4, C5, C6, C7 and C8 for the alphabet character "A" of FIG. 8, that is, in the second row R2.

Through this procedure, when the B data signals "00000000" corresponding to the eighth column C8 for the alphabet character "A" of FIG. 7 are stored in the eighth positions of the respective columns C1, C2, C3, C4, C5, C6, C7 and C8, that is, when they are stored in the eighth row R8, the storing of the B data signals for the alphabet character "A" is completed.

The G and R data signals of the alphabet character "A" are stored in the data memory 830 through the same procedure as that of the B data signals. Further, alphabet characters "B", "C" and "D" of FIG. 7 are also stored in data memory 830 through the same procedure.

Then, the data selector 850 receives, from the OSD generator 700, the B data signals of the first R-G-B signal 701 which have not been converted in accordance with pivoting. Further, the data selector 850 receives, from the data memory 830, the B data signals of the first R-G-B signals 701 which have been converted in accordance with pivoting.

The data selector 850 selects one set of the B data signals from among the B data signals of the converted first R-G-B signals 701 and the non-converted first R-G-B signals 701 so as to supply them, in the form of second R-G-B signals 801, to the scale converter 600.

Under this condition, the display panel 1100 has been turned, and a mode control signal has been generated by the user. Therefore, the data selection control signal 842 is supplied as a signal showing the pivot enable status.

Accordingly, the data selector 850 supplies the B data signals of the converted (converted in accordance with pivoting) first R-G-B signals 701 to the scale converter 600 as second R-G-B signals 801.

The scale converter 600 receives the second R-G-B signals 801 from the B, G and R-pivot circuits 800a, 800b and 800c of the pivot circuit 800.

The scale converter 600 converts the second R-G-B signals 801 in response to the scale control signals 208 from the controller 200.

Then, if the second R-G-B signals 602 which have been scale-converted by the scale converter 600 are outputted, the panel driver 900 receives the second R-G-B signals 602 of the scale converter 600 and provides a driving signal 901 to the display panel 1100 so as to drive the display panel 1100.

The display panel 1100 receive power from the power supply 1000, and receives the second R-G-B signals from the panel driver 900. Further, the display panel 1100 displays the second R-G-B signals on the screen in the form of an on-screen display in response to the driving signal 901 of the panel driver 900.

In this manner, if the user has turned the display panel 1100 by 90 degrees clockwise, the R-G-B signals of the on-screen display are displayed after being pivoted and, therefore, the letters and figures of the on-screen display 1104 are displayed *on a screen 1103 of the screen body 1101 of the display panel 1100* in the normal manner as seen by the user. This is illustrated in FIG. 10.

According to the present invention as described above, even in the case where the user turns the screen body by 90 degrees for the sake of convenience, the letters and figures of the on-screen display are displayed in the normal manner as viewed by the user.

Therefore, the user can use the on-screen display in a convenient manner, regardless of the turning or non-turning of the screen body. Further, even in the case where the chromatic signals and synchronizing signals are synthetically inputted instead of the first and second R-G-B signals, the same pivoting function is carried out.

In the above, the present invention was described based on the specific preferred embodiment, but it should be apparent to those ordinarily skilled in the art that various changes and modifications can be added without departing from the spirit and scope of the present invention, which are defined in the appended claims.

What is claimed is:

1. A video display apparatus with an on-screen display pivoting function, comprising:

an on-screen display (OSD) generating section for receiving horizontal/vertical synchronizing signals and clock signals, and for outputting first video signals in response to OSD control signals;

a pivot circuit section for receiving the first video signals, for storing in a position-converting manner a write address of the first video signals in correspondence with a pre-set pivot write address, and for converting the write address in response to the horizontal/vertical synchronizing signals and the clock signals so as to output the first video signals in the form of second video signals;

a scale converting section for furnishing the horizontal/vertical synchronizing signals and the clock signals to said OSD generating section and said pivot circuit section, respectively, and for receiving the second video signals so as to convert scales of the second video signals in response to scale control signals; and a control section for furnishing the OSD control signals and the scale control signals to said OSD generating section and said scale converting section, respectively, in response to OSD driving signals, and for furnishing pivot control signals to said pivot control section in response to mode control signals generated by a user.

2. The video display apparatus as claimed in claim 1, wherein said pivot circuit section comprises:

an R-pivot circuit for receiving R-data signals of the first video signals from said OSD generating section, for storing in a position-converting manner a write address of the R-data signals in correspondence with a pre-set pivot write address in response to the pivot control signals, and for converting the write address in response to the horizontal/vertical synchronizing signals and the clock signals so as to output the stored R-data signals in a form of R-data signals of the second video signals;

a G-pivot circuit for receiving G-data signals of the first video signals from said OSD generating section, for storing in a position-converting manner a write address of the G-data signals in correspondence with the pre-set pivot write address in response to the pivot control signals, and for converting the write address in response to the horizontal/vertical synchronizing signals and the clock signals so as to output the stored G-data signals in a form of G-data signals of the second video signals; and a B-pivot circuit for receiving B-data signals of the first video signals from said OSD generating section, for storing in a position-converting manner a write address of the B-data signals in correspondence with the pre-set pivot write address in response to the pivot control signals, and for converting the write address in response to the horizontal/vertical synchronizing signals and the clock signals so as to output the stored B-data signals in a form of B-data signals of the second video signals.

3. The video display apparatus as claimed in claim 2, wherein each of said R, G and B pivot circuits comprises:

an analog/digital converting section for receiving relevant picture data signals of R, G and B data signals, respectively, of the first video signals from said OSD generating section so as to convert them to digital signals;

a buffering section for receiving and storing the picture data signals from said analog/digital converting section, and for outputting previous picture data signals upon receiving next picture data signals from said analog/digital converting section;

a pivot controller for outputting storing position control signals and data selection control signals in response to the pivot control signals of said control section;

a data storing section for receiving and storing the picture data signals of said buffering section, and for storing in a position-converting manner a write address of the picture data signals of said buffering section in correspondence with the pre-set pivot write address in response to the storing position control signals; and a data selector for receiving one of the picture data signals of the first video signals and the picture data signals of said data storing section, and for outputting said one of the picture data signals of the first video signals and the picture data signals of said data storing section in a form of second video signals.

4. The video display apparatus as claimed in claim 3, wherein said buffering section comprises eight buffers for storing 8-bit picture data signals from said analog/digital converting section.

5. A video display apparatus with an on-screen display pivoting function, comprising:

a power supply section for supplying power;

a display section for receiving the power from said power supply section, and for displaying a picture of externally inputted video signals to a user;

a signal converter/clock generator section for receiving horizontal/vertical synchronizing signals and video signals, for converting the video signals to first digital signals in response to first control signals, and for generating clock signals;

a decoder for receiving brightness/chromatic signals, and for converting the brightness/chromatic signals to second digital signals in response to second control signals;

a frame rate converter section for receiving the horizontal/vertical synchronizing signals and the video signals from said signal converter/clock generator section, for receiving the brightness/chromatic signals from said decoder, for storing the video signals in response to third control signals, and for converting the stored video signals so as to have a certain frequency ratio in correspondence with display characteristics of the display section;

an on-screen display (OSD) generating section for receiving the horizontal/vertical synchronizing signals and the clock signals, and for outputting first video signals in response to OSD control signals;

a pivot circuit section for receiving the first video signals, for storing in a position-converting manner a write address of the first video signals in correspondence with a pre-set pivot write address, and for converting the write address in response to the horizontal/vertical synchronizing signals and the clock signals so as to output the first video signals in the form of second video signals;

a scale converting section for furnishing the horizontal/vertical synchronizing signals and the clock signals to said OSD generating section and said pivot circuit section, respectively, for converting scales of video signals of said frame rate converting section, and for receiving the second video signals so as to convert scales of the second video signals of said pivot circuit section in response to scale control signals;

a control section for furnishing the first, second and third control signals to said signal converting/clock generating section, said decoder and said frame rate converting section, respectively, for furnishing the OSD control signals and the scale control signals to said OSD generating section and said scale converting section, respectively, in response to OSD driving signals, and for furnishing pivot control signals to said pivot circuit section in response to mode control signals; and a driving section for furnishing video signals and driving signals from said scale converting section to said display section.

6. The video display apparatus as claimed in claim 5, wherein said pivot circuit section comprises:

an R-pivot circuit for receiving R-data signals of the first video signals from said OSD generating section, for storing in a position-converting manner a write address of the R-data signals in correspondence with a pre-set pivot write address in response to the pivot control signals, and for converting the write address in response to the horizontal/vertical synchronizing signals and the clock signals so as to output the stored R-data signals in a form of R-data signals of the second video signals;

a G-pivot circuit for receiving G-data signals of the first video signals from said OSD generating section, for storing in a position-converting manner a write address of the G-data signals in correspondence with the pre-set pivot write address in response to the pivot control signals, and for converting the write address in response to the horizontal/vertical synchronizing signals and the clock signals so as to output the stored G-data signals in a form of G-data signals of the second video signals; and a B-pivot circuit for receiving B-data signals of the first video signals from said OSD generating section, for storing in a position-converting manner a write address of the B-data signals in correspondence with the pre-set pivot write address in response to the pivot control signals, and for converting the write address in response to the horizontal/vertical synchronizing signals and the clock signals so as to output the stored B-data signals in a form of B-data signals of the second video signals.

7. The video display apparatus as claimed in claim 6, wherein each of said R, G and B pivot circuits comprises:

an analog/digital converting section for receiving relevant picture data signals of the R, G and B data signals, respectively, of the first video signals from said OSD generating section so as to convert them to digital signals;

a buffering section for receiving and storing the picture data signals from said analog/digital converting section, and for outputting previous picture data signals upon receiving next picture data signals from said analog/digital converting section;

a pivot controller for outputting storing position control signals and data selection control signals in response to the pivot control signals of said control section;

a data storing section for receiving and storing the picture data signals of said buffering section, and for storing in a position-converting manner a write address of the picture data signals of said buffering section in correspondence with a pre-set pivot write address in response to store position control signals; and a data selector for receiving one of the picture data signals of the first video signals and the picture data signals of said data storing section, and for outputting said one of the picture data signals of the first video signals and the picture data signals of said data storing section in a form of second video signals.

8. The video display apparatus as claimed in claim 7, wherein said buffering section comprises eight buffers for storing 8-bit picture data signals from said analog/digital converting section.

9. The video display apparatus as claimed in claim 5, wherein said frame rate converter section comprises:

a frame memory for storing the digital video signals from said signal converter/clock generator section in response to control inputs; and a frame rate converter for writing the output video signals of said signal converter/clock generator section into said frame memory, and for reading out the video signals written into said frame memory so as to convert the video signals to have a certain frequency ratio in correspondence with display characteristics of said display section.

10. The video display apparatus as claimed in claim 9, wherein said frame rate converter generates said control inputs and provides said control inputs to said frame memory.

11. The video display apparatus as claimed in claim 5, wherein said OSD driving signals are generated by the user.

12. The video display apparatus as claimed in claim 5, wherein said mode control signals are generated by the user.

13. A video display apparatus having an on-screen display pivoting function, comprising:

on-screen display (OSD) generating means for outputting first video signals having a write address in response to OSD control signals;

pivot circuit means for receiving the first video signals, for converting the write address of the first video signals, and for outputting the first video signal in a form of second video signals having scales;

scale converting means for receiving the second video signals and for converting the scales of the second video signals in response to scale control signals; and control means for furnishing the OSD control signals and the scale control signals to said OSD generating means and said scale converting means, respectively, in response to OSD driving signals generated by a user input.

14. The video display apparatus as claimed in claim 13, wherein said pivot circuit means comprises:

an R-pivot circuit for receiving R-data signals of the first video signals from said OSD generating means, for storing a write address of the R-data signals in response to pivot control signals generated by said control means, and for converting the write address so as to output the R-data signals in a form of R-data signals of the second video signals;

a G-pivot circuit for receiving G-data signals of the first video signals from said OSD generating means and for converting the write address so as to output the stored G-data signals in a form of G-data signals of the second video signals; and a B-pivot circuit for receiving B-data signals of the first video signals from said OSD generating means and for converting the write address so as to output the stored B-data signals in a form of B-data signals of the second video signals.

15. The video display apparatus as claimed in claim 14, wherein each of said R,G and B pivot circuits comprises:

an analog/digital converting section for receiving relevant picture data signals of R,G and B data signals, respectively, of the first video signals from said OSD generating means so as to convert them to digital signals;

a buffering section for receiving and storing the picture data signals from said analog/digital converting section, and for outputting previous picture data signals upon receiving next picture data signals from said analog/digital converting section;

a pivot controller for outputting storing position control signals and data selection control signals in response to pivot control signals from said control means;

a data storing section for receiving and storing the picture data signals of said buffering section, and for storing a write address of the picture data signals of said buffering section in response to the storing position control signals; and a data selector for receiving one of the picture data signals of the first video signals and the picture data signals of said data storing section, and for outputting said one of the picture data signals of the first video signals and the picture data signals of said data storing section in a form of second video signals.

16. The video display apparatus as claimed in claim 15, wherein said buffering section comprises eight buffers for storing 8-bit picture data signals from said analog/digital converting section.

17. The video display apparatus as claimed in claim 13, further comprising:

signal converting/clock generating means for receiving horizontal/vertical synchronizing signals and video signals, for converting the video signals to first digital signals in response to first control signals from said control means, and for generating clock signals.

18. The video display apparatus as claimed in claim 17, further comprising:

decoder means for receiving brightness/chromatic signals, and for converting the brightness/chromatic signals to second digital signals in response to second control signals from said control means.

19. The video display apparatus as claimed in claim 18, further comprising:

frame rate converting means for receiving the horizontal/vertical synchronizing signals and the first video signals from said signal converting/clock generating means, for receiving the brightness/chromatic signals from said decoder means, for storing the first video signals in response to third control signals from said control means, and for converting the stored first video signals so as to have a certain frequency ratio in correspondence with display characteristics of a display section.

*20. A method of displaying an on-screen display (OSD) image in a video display apparatus having a screen panel and a rotatable screen body supporting the screen, the method comprising:*

*generating a pivot control signal to be supplied to a pivot circuit so as to display the OSD image suitable to a rotated state of the rotatable screen body;*

*converting scales of externally input color component video signals to have a certain frequency ratio in correspondence with display characteristics of the screen panel;*

*manipulating a key located on the rotatable screen body; and*

*displaying a picture of the converted color component video signals on the screen body, and displaying the OSD image on the displayed picture in accordance with the pivot control signal and the key manipulation.*

*21. The method as claimed in claim 20, further comprising:*

*generating an OSD control signal to request generation of the OSD image according to the key manipulation by the user.*

*22. The method as claimed in claim 20, further comprising:*

*generating a mode control signal indicating a rotated state of the screen body according to the key manipulation by the user,*

*wherein the pivot control signal is generated to control the pivot circuit to generate a pivoted OSD image signal in response to the mode control signal generated by the user.*

*23. The method as claimed in claim 22, further comprising:*

*rotating the OSD image in accordance with the mode control signal,*

*wherein the OSD image rotating operation comprises reordering read sequence of the OSD data which is stored in a data memory.*

*24. The method as claimed in claim 23, wherein the reordering operation is made to form characters and/or symbols represented by the OSD data in a perpendicularly rotated manner.*

*25. The method as claimed in claim 22, further comprising:*

*rotating the OSD image in accordance with the mode control signal,*

*wherein the OSD image rotating operation comprises reordering read addresses of the OSD data which is stored in a data memory.*

*26. The method as claimed in claim 25, wherein the reordering operation is made to form characters and/or symbols represented by the OSD data in a perpendicularly rotated manner.*

*27. The method as claimed in claim 20, wherein the displaying operation comprises:*

*reading OSD data contained in the OSD image as first OSD data; and*

*modifying the first OSD data as second OSD data according to the generated mode signal.*

*28. The method as claimed in claim 27, wherein the modifying operation comprises:*

*storing a write address of the first OSD data in a predetermined format that corresponds to the rotated position of the screen body.*

*29. A method of displaying an OSD image including an on-screen display (OSD) in a video display apparatus having a screen panel and a rotatable screen body, the method comprising:*

*receiving externally input video signals having a picture;*

*generating a pivot control signal to display the OSD image suitable to a rotated state of the rotatable screen body;*

*converting scales of the input video signals to have a certain frequency ratio in correspondence with display characteristics of the screen panel;*

*displaying the converted picture;*

*modifying OSD data corresponding to the OSD image including the OSD with respect to the pivot control signal; and*

*displaying the OSD image that corresponds to the modified OSD data on the converted picture displayed on the screen panel.*

*30. A video display apparatus having a screen body and a screen panel to display an on-screen display (OSD) image, the video display apparatus comprising:*

*a converter to receive externally input video signals having a picture and to convert scales of the input video signals to have a certain frequency ratio in correspondence with display characteristics of the screen panel;*

*a controller to generate a pivot control signal to display the OSD image suitable to a rotated state of the screen body; and*

*a circuit unit to display the picture of the externally inputted video signals on the screen panel and to display the OSD image at a rotated position in accordance with the pivot control signal on the displayed picture.*

*31. A video display apparatus having a rotatable display unit, the video display apparatus comprising:*

*an external signal unit to receive an external image signal;*

*an OSD generator to generate an internal OSD image signal in response to an OSD driving signal;*

*a control unit to generate a pivot control signal to display the OSD image suitable to a rotated state of the rotatable display unit and a OSD driving signal according to a key manipulation by a user to indicate the rotated state of the display unit and request an OSD, respectively; and*

*a circuit unit to drive the display unit to display the external image signal and to drive the display unit to display the internal OSD image signal at a rotated position in accordance with the pivot control signal generated by the control unit,*

*wherein the display unit comprises one or more function keys to change the operation settings thereof by indicating the rotated state of the display unit such that the circuit unit drives the display unit to display the internal OSD image signal in response to a selection of the one or more function keys.*

*32. The video apparatus as claimed in claim 31, wherein the display unit comprises:*

*a screen; and*

*a rotatable screen body surrounding the screen having the one or more function keys installed thereon.*

*33. A video display apparatus having an on-screen display pivoting function, comprising:*

*a rotatable display;*

*a controller to receive at least one of a mode control signal and an on-screen display (OSD) control signal, and to generate at least one of a pivot control signal and a OSD driving signal, respectively;*

*a frame converter to receive video signals and to convert the video signals so as to have a certain frequency ratio in correspondence with display characteristics of the display;*

*an on-screen display (OSD) generator to receive the converted video signals and to output first video signals in response to the OSD control signal;*

*a pivot circuit section to receive the first video signals, to store in a position-converting manner a write address of the first video signals in correspondence with a preset pivot write address, and to convert the write address so as to output the first video signals in the form of pivoted second video signals in response to the pivot control signal; and*

*a scale converting section to convert scales of video signals of the frame rate converter, and to receive the pivoted second video signals to convert scales of the second video signals of the pivot circuit in response to scale control signals.*

* * * * *